(12) United States Patent
Freeman et al.

(10) Patent No.: US 7,859,941 B2
(45) Date of Patent: Dec. 28, 2010

(54) TRANSMIT APODIZATION CONTROL FOR MICROBEAMFORMERS

(75) Inventors: Steven Freeman, Seattle, WA (US);
Bernard Savord, Andover, MA (US);
Andrew Robinson, Bellevue, WA (US);
Shon Schmidt, Seattle, WA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1343 days.

(21) Appl. No.: 10/569,050

(22) PCT Filed: Aug. 18, 2004

(86) PCT No.: PCT/IB2004/051486

§ 371 (c)(1),
(2), (4) Date: Feb. 21, 2006

(87) PCT Pub. No.: WO2005/019856

PCT Pub. Date: Mar. 3, 2005

(65) Prior Publication Data

US 2006/0264747 A1    Nov. 23, 2006

Related U.S. Application Data

(60) Provisional application No. 60/497,664, filed on Aug. 25, 2003.

(51) Int. Cl.
*G01S 7/52* (2006.01)
*G01S 7/524* (2006.01)
*G01S 7/521* (2006.01)
*G10K 11/34* (2006.01)
*A61B 8/00* (2006.01)

(52) U.S. Cl. .................................................... 367/11
(58) Field of Classification Search ................. 367/138, 367/11, 103, 105; 600/437
See application file for complete search history.

(56) References Cited

U.S. PATENT DOCUMENTS

| 5,997,479 | A | 12/1999 | Savord et al. |
| 6,013,032 | A | 1/2000 | Savord |
| 2006/0264747 | A1* | 11/2006 | Freeman et al. ............. 600/437 |
| 2009/0016163 | A1* | 1/2009 | Freeman et al. ............. 367/103 |
| 2009/0171213 | A1* | 7/2009 | Savord ........................ 600/447 |

FOREIGN PATENT DOCUMENTS

| WO | WO 03011139 A1 * | 2/2003 |
| WO | WO 2005019856 A1 * | 3/2005 |

* cited by examiner

*Primary Examiner*—Dan Pihulic
(74) *Attorney, Agent, or Firm*—W. Brinton Yorks, Jr.

(57) ABSTRACT

Apodization control techniques for a microbeamformer including a plurality of microbeamformer channels each including a transducer, a microbeamformer transmitter for driving the transducer, a microbeamformer receiver for receiving signals from the transducer and usually a delay element for delaying the received transducer signals. To improve the generation of waveforms by the transducers, the voltage provided to the microbeamformer transmitters is adjusted and/or the current provided by the microbeamformer transmitters is adjusted. The microbeamformer channels can also be grouped together into patches and/or clusters with the patches and clusters being provided with a common voltage source or current.

31 Claims, 5 Drawing Sheets

TRANSMIT APODIZATION CONTROL FOR MICROBEAMFORMERS

CROSS REFERENCE TO RELATED CASES

Applicants claim the benefit of Provisional Application Ser. No. 60/497,664, filed 25 Aug. 2003.

FIELD OF THE INVENTION

The present invention relates generally to ultrasonic transducers for medical imaging and more particularly to a system for apodization control in an ultrasonic transducer, i.e., to control the shape of a transmit beam of an ultrasonic transducer in particular in the context of sub-array beamforming.

BACKGROUND OF THE INVENTION

Sub-array beamforming or microbeamforming involves the use of transmit and/or receive arrays of ultrasonic transducers grouped into sub-arrays. U.S. Pat. No. 5,997,479, incorporated by reference herein, describes one application of microbeamforming in which a plurality of transducer elements are grouped into several transmit sub-arrays, and a receive array includes a plurality of transducer elements grouped into several receive sub-arrays. FIG. 2 of the '479 patent also shows several intra-group transmit processors, connected to the transmit sub-arrays, and which generate a transmit acoustic beam directed into a region of interest, and several intra-group receive processors connected to the receive sub-arrays. Each intra-group receive processor is arranged to receive, from the transducer elements of the connected sub-array, transducer signals in response to echoes from the transmit acoustic beam. Each intra-group receive processor includes delay and summing elements which delay and sum the received transducer signals. A receive beamformer includes several processing channels connected to the intra-group receive processors, and each processing channel includes a beamformer delay which synthesizes receive beams from the echos by delaying signals received from the intra-group receive processor, and a beamformer summer which receives and sum signals from the processing channels.

Further, U.S. Pat. No. 6,013,032, incorporated by reference herein, describes another microbeamformer in which each sub-array of the transducer array is connected to a sub-array beamformer with each sub-array beamformer including a sub-array processor and a phase shift network connected to the output of the sub-array processor (see FIG. 2 and the description thereof). A primary beamformer includes a summing unit which sums the outputs of beamformer channels to which the output of the sub-array beamformers is provided, and thereby provides a beamformer signal that represents the received ultrasound energy along a desired scan line.

The term microbeamformer, as generally used hereafter, describes a sub-array beamformer that is integrated within the handle of the transducer in order to facilitate connection to a very large number of piezo-electric sensor elements arranged in a 2D array.

Such a configuration allows for real-time volumetric imaging, when used in combination with a mainframe beamformer and back-end display subsystem. Instead of integrating the electronics of the sub-array beamformer within a handle of a transducer, they may be arranged in the mainframe. The term microbeamforming could also be applied to 1D arrays.

In microbeamforming, control of the shape of the transmit beam is an important aspect for successful implementations of multi-line imaging transducers, in particular, for real-time volume acquisition where high-order multi-line imaging is required to achieve sufficient volume acquisition rates. Control of the shape of the transmit beam is possible because in current ultrasonic transducers, each element in the transducer array is typically connected to control electronics so that each element is individually controllable.

Also, in microbeamforming and other beamforming applications including a transducer array, only a portion of the total number of elements in the transducer array may be operable at any time. This is referred to as controlling the aperture of the transducer array. The aperture of the transducer array refers to the configuration of the transducer elements that are active at any moment. The electronic control of each element in the transducer allows the transmit and receive signals to be shaped and delayed to provide an appropriate signal for the type of imaging being performed.

Figure 8:
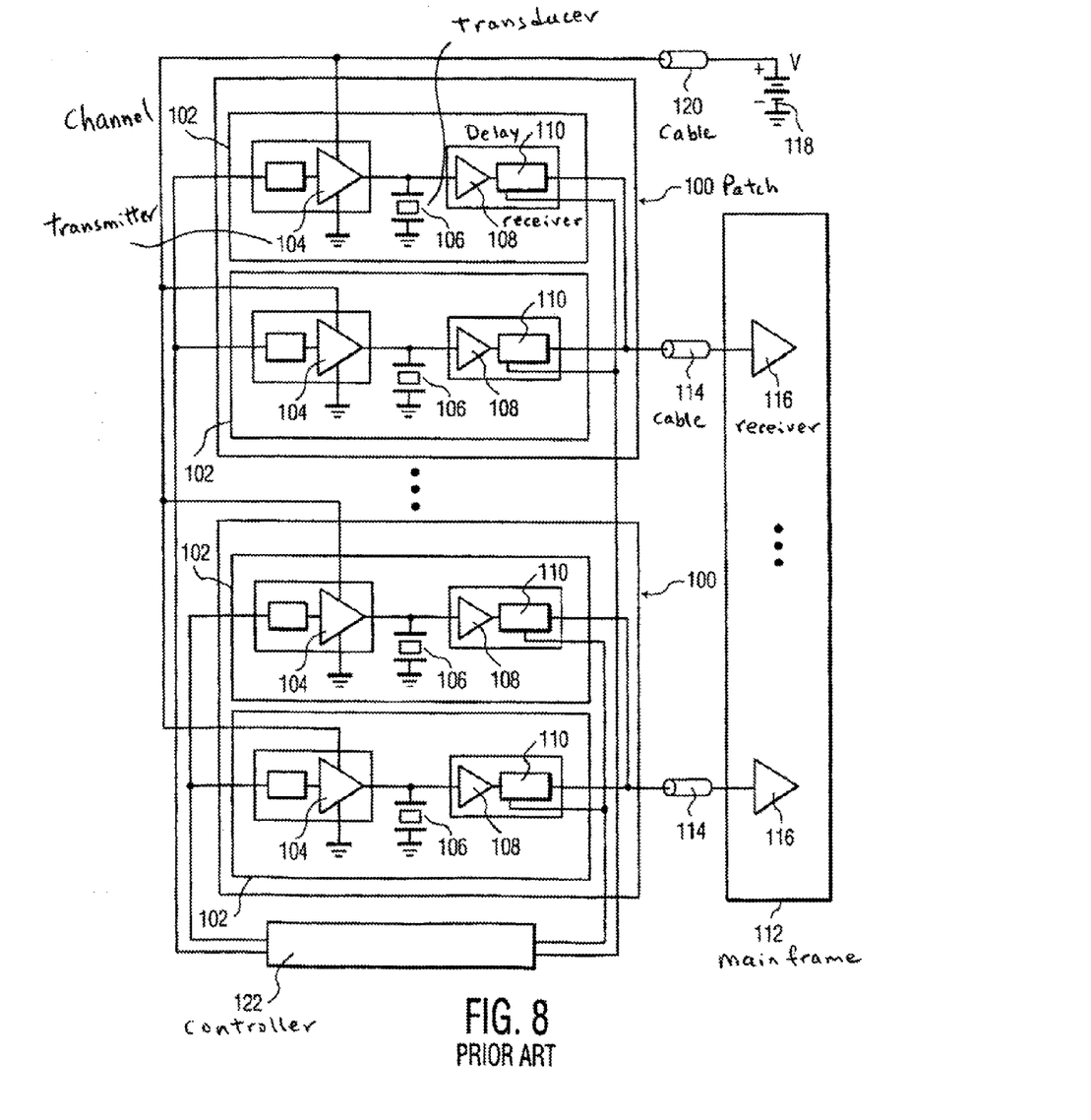
FIG. 8 is a schematic of a microbeamformer portion of a prior art ultrasonic transducer.

Referring to FIG. 8, microbeamformers are often constructed with a plurality of microbeamformer patches 100 with each microbeamformer patch (or sub-array) 100 including at least one and most often a plurality of microbeamformer channels 102. Each microbeamformer channel 102 is connected to a transducer 106 and includes a microbeamformer transmitter 104 for driving the transducer 106 and a microbeamformer receiver 108 for receiving signals from the transducer. Preferably, a delay 110 is also provided to delay the received transducer signals and a control circuit 122 is provided to stimulate the transmitter 104. Additional details about the manner in which microbeamformer channels operate can be found in the patents discussed above. Thus, the microbeamformer has individual transmitters for each microbeamformer channel 102 to provide beam steering and focusing control. While additional transmitters are typically provided on the mainframe 112, these mainframe transmitters are not used to drive the transducers 106. Rather, coaxial cables 114 are connected between receivers 116 on the mainframe 112 and the microbeamformer patches 102 so that the coaxial cables 114 are only used for the receive path and not for the transmit path. A single power supply 118 is coupled to all of the microbeamformer patches 100 via a coaxial cable 120.

In a microbeamformer such as shown in FIG. 8, it is known that by controlling the timing and transmit energy supplied to some or all of the microbeamformer channels (commonly referred to as "transmit beamforming"), the ultrasonic interrogation pulse sent into an object being examined can be shaped to provide, for example, high resolution at various depths. Similarly, by electronically altering the receive weights and delays (referred to as "receive beamforming"), the received energy can be used to form high quality images at various depths.

One manner for controlling the transducer elements is known as apodization. Apodization of an ultrasonic transducer aperture is a gradual reduction of the transmit amplitude and/or receive gain from the center of the aperture to the edges of the aperture with a resultant decrease in beam side lobe levels.

In practice, different apodization methods are applied. For example, it is known to use square wave pulsers with power supply voltages that vary across the active aperture and it is also known to apply a per-channel apodization using wave-shaping transmitters. This capability is obtained through additional complexity in either the power management components or the individual transmitters.

When designing microbeamformers for real-time 3D, space is at a premium because the microbeamformer integrated circuits (ICs) must fit in the handle of the transducer. In addition, power dissipation must be limited because of the difficulty in providing cooling for the microbeamformer electronics. As such, the transmitter in the microbeamformer should have as simple and basic a construction as possible and complex modification of the transmitter to provide apodization should be avoided.

The microbeamformer ICs in one prior art system use unipolar pulsers that provide two levels of apodization on a per-element basis—on or off. There are drawbacks to this system most notably, the apodization is limited and often does not provide for adequate beam sidelobe control. It would thus be advantageous to provide new apodization control techniques for transmission from microbeamformers which would allow for adequate beam sidelobe control without significantly complicating the circuitry that must reside within the transducer handle.

To control the acoustic signal generated by the transducers, some prior art ultrasound imaging systems drive the array elements in the transducer with a simple square wave (boxcar) type voltage excitation signal of varying duration and duty cycle. It is known in the art how to create these voltage excitation signals given a fixed or variable mainframe power supply. Often, the voltage or pulse width is changed to try to alter the amplitude of the acoustic signal. Changing the drive voltage changes the total power that can be supplied to drive the transducer whereas changing the pulse width of the driving voltage alters the way the transducer resonates and different acoustic signal amplitudes are possible. For the purposes of apodization across an array, having different drive voltages on every transducer works well. However, for those drivers commanded to output low voltages, the driver circuits themselves dissipate a lot of energy since the output voltage and the system high voltage bus may be very different. For microbeamformers, this inefficiency cannot be tolerated (due to the associated probe heating) so it would be advantageous to provide an efficient driving technique that allows for different output voltage pulses.

To generate a square wave voltage pulse to the transducer, a transmitter needs to source or sink significant amounts of current in order to charge up the capacitance associated with the transducer. Unfortunately, the current through pull-up and pull-down MOSFET devices is directly proportional to their width, so a very large (wide) device is needed to source or sink large currents. Since space is at a premium in microbeamformers, it would be advantageous to develop a pulsing technique that does not require large driver currents so smaller devices may be used.

It is known in the art of transducer design that the current supplied to a transducer is proportional to the velocity of the face of that transducer and hence of the pressure (acoustic amplitude) developed in the medium being transmitted into. In order to change the apodization across the array, it may be useful to exploit this sensitivity of the transducer drive current while maintaining the relatively small size of the microbeamformer.

OBJECTS AND SUMMARY OF THE INVENTION

It is an object of the present invention to provide a new system for apodization control of an ultrasonic transducer array driven by a microbeamformer.

It is another object of the present invention to provide a new system for apodization control of an ultrasonic transducer array driven by a microbeamformer using pull-up/pull-down devices in conjunction with multiple pulser power supply voltages.

It is yet another object of the present invention to provide apodization control using multiple switchable current sources to drive the ultrasonic transducer.

It is still another object of the present invention to provide apodization control using one or more switchable current sources that drive the ultrasonic transducer for varying amounts of time.

In order to achieve these objects and others, a system for apodization control of a microbeamformer in accordance with the invention includes a plurality of microbeamformer channels grouped or allocated into a plurality of microbeamformer patches, each microbeamformer channel including a connection to a transducer, a microbeamformer transmit control and driver circuit for exciting the transducer, a microbeamformer receiver for receiving the transducer signals and usually a delay for delaying the received transducer signals. The microbeamformer transmitters in each patch are connected to a common power supply node but have individual timing control circuits. A mainframe beamformer has a plurality of mainframe channels each including a mainframe receiver and a mainframe transmitter for transmitting a pulsed voltage. Each microbeamformer patch is connected to a respective mainframe channel, for example, by a cable connected to the common node of the patch, such that the mainframe receiver inputs signals from the patch of microbeamformer receiver datapaths.

There several different ways to achieve the objectives of the present invention and they involve either providing unique power supply voltage connections to the microbeamformer patches or providing unique driver electronics to control the current driven to/from each associated transducer. The first technique uses mainframe transmit drivers to supply each patch with a different high voltage power supply that is then used to drive the individual transducers within that patch to different voltages. The second technique allocates a number of variable high voltage supplies in the mainframe (separate and in addition to the mainframe transmit drivers) that are connected to one or more of the microbeamformer patches. A third technique uses a single fixed high voltage power supply for all the microbeamformer patches but provides different current drive outputs per patch or per transducer to control the amplitude of the transmitted acoustic waveform. Finally, a fourth technique uses a single fixed high voltage power supply for all the microbeamformer patches and a single current drive output, but the length of time the current is asserted to the transducers is variable to deposit varying amounts of electrical power to the transducers and thus excite different acoustic amplitudes. These techniques can be used and implemented individually or in various combinations to achieve a plethora of different microbeamformer transmitter configurations with various drive capabilities. Each technique accomplishes the object of the invention to provide apodization control of the ultrasound transducer array and these are summarized below.

The first technique to apply apodization to microbeamformed arrays uses the mainframe transmit drivers in the mainframe beamformer to supply each patch with a different high voltage power supply that is then used to drive the individual transducers. Timing control circuits in each microbeamformer channel determine when the associated microbeamformer transmitter within the patch excites the transducer. The mainframe transmitter channel voltage, and therefore the patch supply voltage, can be varied arbitrarily in this configuration since the mainframe transmitters are designed to provide a wide range of output voltages. The transmitter in each mainframe channel may be arranged to transmit a unipolar pulse for the duration of each transmit burst by the microbeamformer transmitters such that the pulses driven by the microbeamformer transmitters have an amplitude equal to the unipolar pulse from the mainframe channel. In this manner, the mainframe transmitters become a variable power supply for the patch of transmitters in the microbeamformer.

A complicating detail of this first technique involves separation of the transmit events, which are inherently high voltage, and the receive events which are inherently low-voltage. Specifically, to prevent transmitter noise from contaminating the receive datapath, diodes are provided between the microbeamformer transmitters and the cable and between the cable and the mainframe transmitters. Also, to protect the receivers when the transmitters are operative, protection devices such as switches can be provided both in the output path from the microbeamformer receivers and in the input path of the mainframe receiver.

By providing an independent power supply voltage to each patch via a mainframe transmitter, each patch can transmit different amplitude waveforms and thereby provide for enhanced shaping of the transmit beam.

In another embodiment of the invention, the patches are grouped into a plurality of clusters with each cluster preferably including a plurality of patches. Microbeamformer transmitters are then powered from the mainframe by a plurality of individually adjustable power supplies (or mainframe transmitters) and each cluster is connected to a respective power supply, such as by a cable. The power supply voltage applied to each cluster is independently adjustable or settable, for example, to a different voltage for each pulse repetition interval.

Although the transmitters in each microbeamformer patch are not powered by a dedicated power supply as in the embodiment above, clusters of microbeamformer patches are powered by a common power supply and by appropriate assignment of the microbeamformer patches to clusters, the shape of the transmit beam can be effectively and advantageously controlled. Eliminating the diodes and switches is the primary benefit of this embodiment without dramatically increasing the number of cables needed to power the various patch transmitters.

It is a straightforward extension of this embodiment to include high voltage switches (or other switching means) within the microbeamformer transmitters that can selectively choose from a small number of mainframe-supplied high voltage power rails. That is, rather than having the patches or microbeamformer channels clustered together to share a common high voltage supply each microbeamformer channel can include one or more high voltage switches to select from a small number of power rails. The selection of which power rail to use and, therefore, the applied drive voltage can be made on a channel by channel basis and can be different for each pulse repetition interval.

In a third embodiment of the invention, the microbeamformer transmit drivers can be specifically designed to drive a particular transducer with a variable current source rather than as a voltage source. Unlike mainframe transmitters that must be able to drive many different types of transducers, the microbeamformer transmitters can be designed to optimally and efficiently drive a specific transducer. As such, it is therefore possible to use a plurality of switchable current sources and sinks in each microbeamformer transmitter to drive the transducer, where higher currents excite larger acoustic amplitudes and smaller currents excite smaller acoustic amplitudes from the transducer. These apodization techniques can be accomplished using a single high voltage power supply common to all microbeamformer channels. Moreover, the control of the apodization by selecting specific source and sink currents can easily be accomplished at each microbeamformer channel rather than being grouped into patches or clusters of patches.

This embodiment of the invention includes a plurality of switchable current sources, each including a series switch and pull-up device as well as a plurality of switchable current sinks, each including a series switch and pull-down device. Such a configuration of switchable current sources and sinks is known to those skilled in the art as a current mode digital to analog converter (DAC). The aforementioned pull-up devices can be PMOSFET (also known as PMOS) devices that are biased to provide constant currents from the high voltage supply to the transducer. The PMOSFET devices can also be biased off, so as to act as a switch, or a separate PMOSFET device may be allocated in series to accomplish the switch function. Similarly the pull-down devices can be NMOSFET (also known as NMOS) devices that are biased to provide constant currents from the transducer down to ground (or a negative supply). The NMOSFET devices can also be biased off, so as to act as a switch, or a separate NMOSFET device may be allocated in series to accomplish the switch function.

It is known to those skilled in the art that the current carrying capacity of PMOS and NMOS devices is proportional to their width and is also a function of the applied gate bias. Therefore, in this embodiment, the microbeamformer transmitter would preferably include a small number of PMOS and NMOS devices that can be selectively enabled (by their gate bias) to supply various drive currents to and from each transducer. For maximum efficiency, pull-up and pull-down devices may not be conducting current at the same time, however, different, less-efficient modes of operation are possible.

During normal operation of a preferred embodiment of the invention, a selected subset of PMOS devices will be enabled to drive the transducer. The number of devices enabled and therefore the available drive current can be controlled on each microbeamformer channel individually. The PMOS devices will preferably be enabled for a duration of approximately one quarter of a wavelength of the acoustic signal that is to be excited. Subsequently, a selected subset of the NMOS devices will be enabled to discharge the transducer for a duration equal approximately to one quarter of a wavelength of the acoustic signal being excited. Note, however, that if the selected pull-up and pull-down currents are not equal, the durations of the pull-up and pull-down events may not be equal. The voltage developed on the transducer is a function of the applied drive current and the capacitance of the transducer, but it will in general be a ramp up to some voltage followed by a ramp back down. The slope of these ramps is defined by the driver current and transducer capacitance.

It is a key component of this embodiment of the invention that the drive currents during pull-up and pull-down events be programmable but that the duration of these events be fixed (for a particular desired acoustic frequency). That is, to accomplish different apodization levels across the array, each of the microbeamformer channels may drive different currents for a specified pull-up and pull-down duration that is common among all channels. The time at which the channels drive the transducers depends on the desired delay and the selected current driven to the transducers depends on the desired apodization.

It is a straightforward extension of the embodiment above to provide yet another embodiment of the invention where one pull-up and one pull-down device are allocated on every microbeamformer channel to drive the transducer for durations of time that vary according to the desired apodization across the array. This pulse-width-modulation approach varies the amount of time the pull-up and pull-down devices are enabled and thus controls the total power delivered to the transducer. The resultant acoustic waveform amplitude will be roughly proportional to the width of the applied current pulses.

The key differences between this embodiment and the previous multi-current embodiment is in the way in which the microbeamformer transmitters are controlled. In the multi-current embodiment, the apodization function specifies the current setting but the pulse-up and pulse-down sequence is the same among all channels (though the start time of this sequence differs from channel to channel). In this embodiment, the apodization function specifies the pulse widths of the up and down events but the pull-up and pull-down currents are the same among all channels (and again the start time of the sequence differs from channel to channel). Clearly there are tradeoffs in timing control complexity between these embodiments and this must be traded off against high voltage current source complexity (size) differences.

It should be evident to those skilled in the art that each of these embodiments constitutes novel power supply connection paradigms, high voltage driver circuit designs, and driver timing control techniques that could be combined in various different configurations. Depending upon the application and implementation constraints, one of these various embodiments or combinations thereof may be optimal or desired. This invention should be understood to cover the individual embodiments described as well as arbitrary combinations thereof.

BRIEF DESCRIPTION OF THE DRAWINGS

The invention, together with further objects and advantages hereof, may best be understood by reference to the following description taken in conjunction with the accompanying drawings, wherein like reference numerals identify like elements and wherein.

DETAILED DESCRIPTION OF THE INVENTION

Described below are several techniques for apodization control of a microbeamformer of an ultrasonic transducer. These techniques share a common goal of improving the ability to shape the transmit beams by adjusting the drive voltage or drive current provided to each transducer or to a plurality of transducers in a microbeamformer patch. The techniques can be used independently or to the extent possible, in combination with one another.

Figure 1:
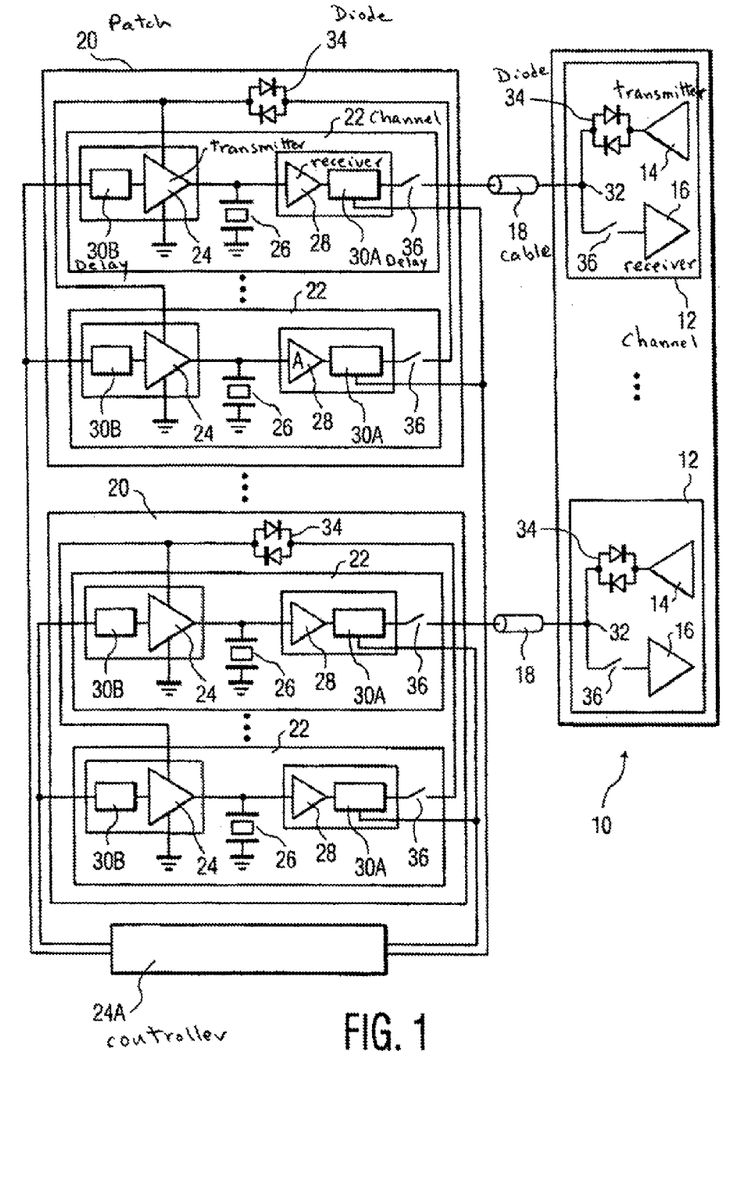
FIG. 1 is a schematic of a first embodiment of a microbeamformer portion of an ultrasonic transducer using apodization control in accordance with the invention.

In a first embodiment of a system for apodization control of a microbeamformer shown FIG. 1, the voltage provided to each microbeamformer patch is adjustable. A mainframe beamformer 10 of the ultrasonic imaging system includes a plurality of mainframe channels 12, each mainframe channel 12 including a mainframe transmitter 14 and a mainframe receiver 16. A coaxial cable 18 connects each mainframe channel 12 to a respective sub-array beamformer also referred to herein as a microbeamformer patch 20. Each patch 20 includes a plurality of microbeamformer channels 22 each of which includes a microbeamformer transmitter 24, a transmitter timing control circuit 24A, a transducer 26 which is driven by a signal from the microbeamformer transmitter 24, a microbeamformer receiver 28 which receives signals from the transducer 26 and a delay element 30A. Instead of a coaxial cable 18, other cables and electrical connection components as known in the art can be used. A delay element 30B is often usually provided for the microbeamformer transmitters 24.

Each mainframe transmitter 14 provides a power supply voltage to the respective patch 20 via the cable 18. Thus, both the mainframe transmitter 14 and the mainframe receiver 16 are connected via a node 32 to the cable 18. By coupling each of the mainframe transmitters 14 to a respective patch 20, an individually adjustable voltage can be provided to the microbeamformer transmitters 24 in the microbeamformer channels 22 of each patch 20 to therefore enable control of the microbeamformer channels 22 in each patch 20 and provide any desired shaping of the transmit beam generated by the transducers 26 in each patch 20.

In operation, a unipolar pulse is transmitted by the mainframe transmitters 14 to the microbeamformer patches 20, more specifically to the microbeamformer transmitters 24 in each microbeamformer patch 20, for at least the duration of each transmit burst. The voltage of the unipolar pulse is intermittently applied by the microbeamformer transmitters 24 in each microbeamformer patch 20 to create unipolar pulses to the transducers 26 in each microbeamformer patch 20. The time at which the microbeamformer transmitters 24 drive the transducers 26 high or low, and how many such pulses occur, is controlled uniquely and individually within each of the microbeamformer channels 22, but the amplitude of the pulses is set by the voltage applied by the mainframe transmitters 14 which is the same for all of the microbeamformer transmitters 24 in one patch. Thus, both the mainframe transmitters 14 and the microbeamformer transmitters 24 contribute to the driving signals for the transducers 26.

Diodes 34 are added in series with the transmitter power supply branch, both in the mainframe channels 12 and in the microbeamformer patches 20, to isolate the mainframe transmitters 14 and the microbeamformer transmitters 24 from the signal path during the receive mode. Although as shown in FIG. 1, one set of diodes 34 is arranged in each microbeamformer patch 20 to isolate all of the microbeamformer transmitters 24 in that microbeamformer patch from the signal path during the receive mode, in the alternative, several sets of diodes could be used. A second set of diodes 34 is arranged in each mainframe channel 12 between the mainframe transmitter 14 and the node 32. Instead of diodes 34, other isolation devices can be used as known to those skilled in the art.

Switches 36 are provided in the receiver branch, both in the mainframe channels 12 and in the patches 20, to add high-voltage protection to the input of the mainframe receiver 16 and the output of the microbeamformer receiver 28 so that they can withstand transmit events. Although as shown in FIG. 1, one switch 36 is arranged in each microbeamformer channel 22 in each patch 20, alternative placements of switches could be used in the patches 20 so long as high-voltage protection is added to the output of the microbeamformer receivers 28.

Another embodiment of a system for apodization control in accordance with the invention has a simpler construction than the embodiment shown in FIG. 1 in that it does not require additional diodes and receiver input/output protection, e.g., switches. Although the placement of the diodes and receiver output protection provides advantages over prior art apodization control techniques, it adds additional parts and control complexity.

Figure 2:
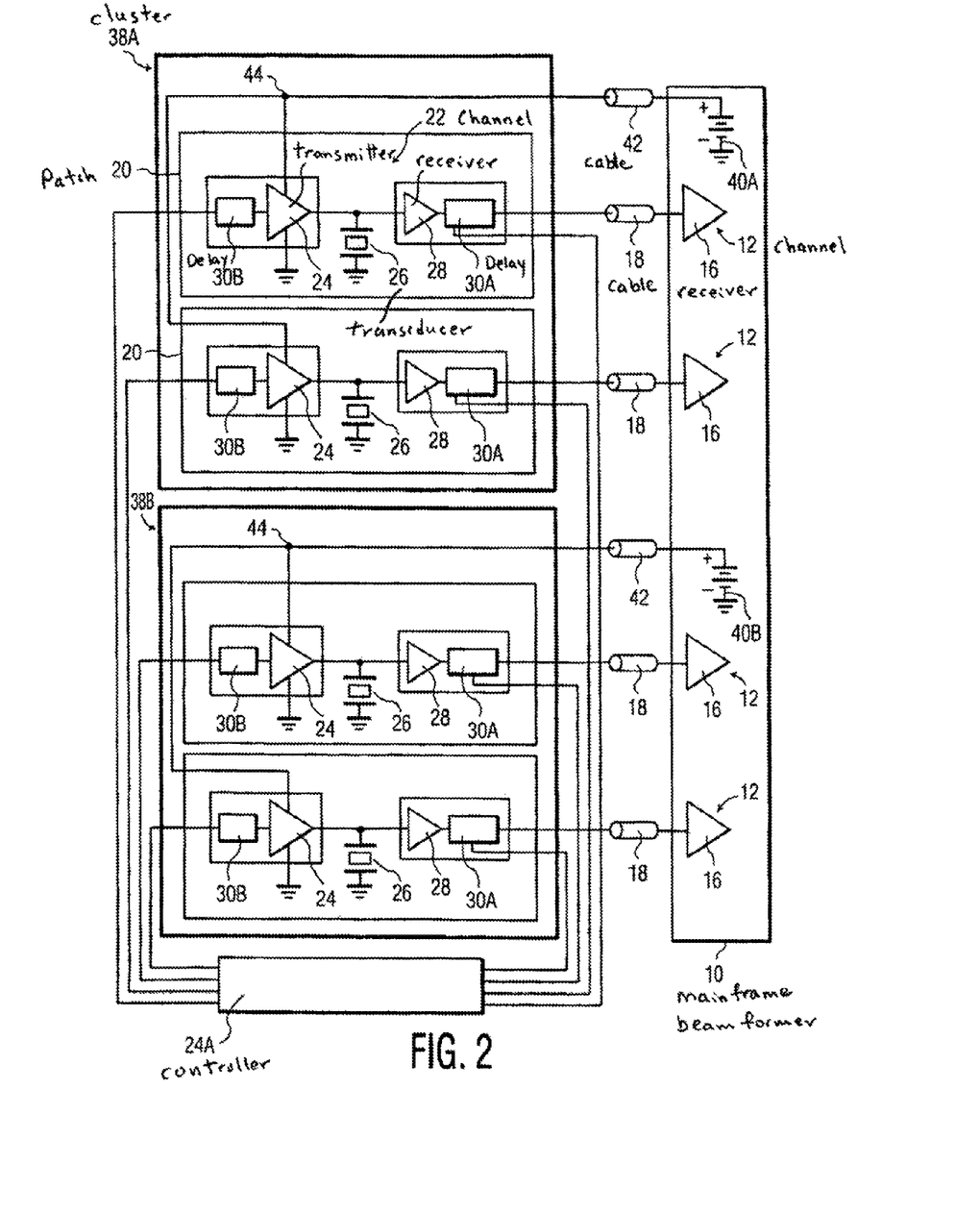
FIG. 2 is a schematic of a second embodiment of a microbeamformer portion of an ultrasonic transducer using apodization control in accordance with the invention.

Referring now to FIG. 2, this embodiment does not provide for individual apodization for each patch 20 but rather provides for independent apodization for a plurality of discrete groups or clusters 38A,38B of patches 20 (only two of which are shown in FIG. 2). In this embodiment, the patches 20 are grouped into a plurality of clusters 38A,38B, with at least one and possibly all of the clusters 38A,38B having a plurality of patches 20. Each cluster 38A,38B has a power supply voltage 40A,40B which enables the transmit voltage of the patches 20 in that cluster 38A to be independent of the transmit voltage of the patches 20 in the other cluster(s) 38B. In FIG. 2, only one microbeamformer channel 22 is shown in each patch 20 for simplicity, but each patch 20 is understood to comprise multiple microbeamformer channels 22 (for example as shown in FIG. 1).

A coaxial cable 42 connects each power supply voltage 40A,40B to a node 44 of the respective cluster 38A,38B which is hardwired to the microbeamformer transmitters 24 of each patch 20 in that cluster. Instead of a coaxial cable 42, other cables or electrical connection components can be used.

Figure 3:
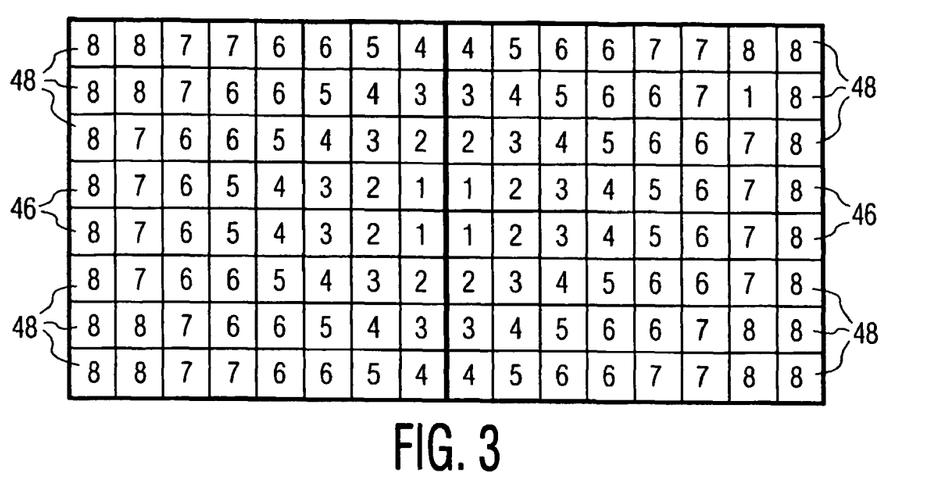
FIG. 3 is a diagram showing a possible grouping of microbeamformer patches into clusters in accordance with the second embodiment of the invention.

This embodiment impacts the microbeamformer IC architecture in that it would have to be designed to provide a plurality of separate power supplies to the die (but only one to each patch), and to have the separate power supplies arranged in a manner that provides useful apodization. For example, FIG. 3 illustrates a potential arrangement for assigning patches 20 to clusters 38 in which 16 dies for forming integrated circuits 46,48 are used (the double lines delineate the boundaries between the 16 ICs). The 128 patches 20 are grouped into eight clusters 38 (by number). The four ICs 46 in the center two rows use all eight power supplies, while the other ICs 48 use fewer. However, the ICs 46,48 can still be identical if the supply voltage for each patch 20 is available as an input pin/pad in which case, the allocation of the supply voltage to each patch 20 can take place at the level of interconnect between the ICs 46,48 and the cabling where it is easier to customize. Thus, in this embodiment, a number of dedicated power supplies are hardwired to the clusters 38 each of which comprises at least one and preferably a plurality of patches 20.

The power supply voltages 40A,40B provided in the mainframe may be any known construction for providing regulatable power to the microbeamformer transmitters 24.

Figure 4A:
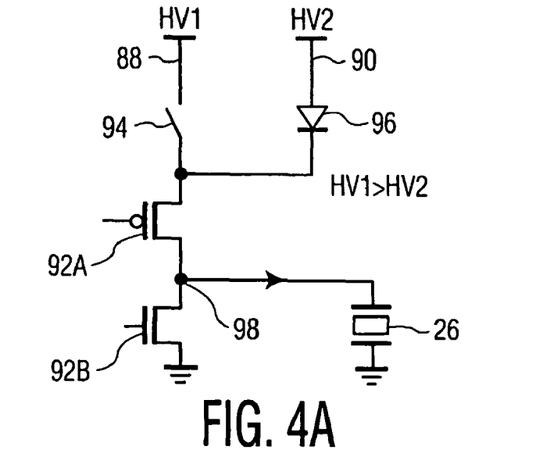
FIG. 4A is a schematic of a first embodiment of a drive voltage control circuit in accordance with the invention.

Another embodiment of a system for apodization control in accordance with the invention has a small number of high voltage rails (e.g., two) supplied to every microbeamformer transmitter. The transmitter can then be commanded to choose between these supplies when it drives the associated transducer. As shown in FIG. 4A, two HV rails 88,90 are connected to a single PMOS pull-up device or transistor 92A. HV rail 88 (designated HV1) has a higher voltage than HV rail 90 (designated HV2). A high voltage switch 94 is interposed between HV rail 88 and the pull-up device 92A while a diode 96 is interposed between the HV rail 90 and the pull-up device 92A. The pull-up device 92A is connected at a node 98 to the transducer 26. A pull-down device or transistor 92B is connected to the node 98 to discharge the transducer 26.

By setting HV2 at a voltage below HV1, either voltage supply can be selected by activation of the single switch 94 on a per-element (or per-patch) basis to create unipolar pulses with amplitudes set by whichever voltage supply is selected. In one possible operational embodiment, transducers 26 near the periphery of the transmit aperture will have the lower HV2 supply selected. The diode 96 could also be a switch similar to switch 94, but would require additional circuits to turn on the device. More than two HV supplies can be supported by including additional switches and associated supplies in parallel with switch 94.

Figure 4B:
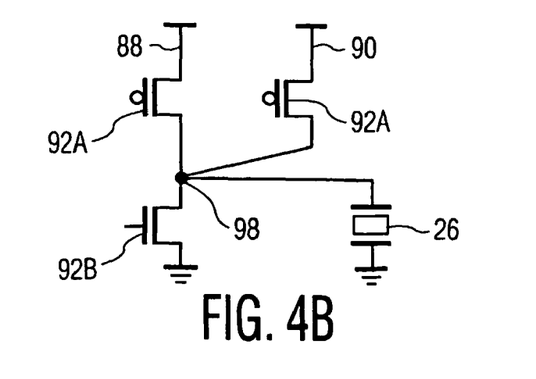
FIG. 4B is a schematic of a second embodiment of a drive voltage control circuit in accordance with the invention.

Instead of connecting two HV rails to a single pull-up device, one via a switch and the other via a diode as shown in FIG. 4A, it is possible to use a separate pull-up device 92A for each HV rail 88,90 as shown in FIG. 4B. The pull-up devices 92A act as switches in this embodiment so separate switches (element 94 in FIG. 4A) are not required.

The technique of providing multiple voltage sources and switching between the voltage sources using a pull-up device as disclosed in FIG. 4A may be applied in all situations when voltage is provided to the microbeamformer transmitters 24. Thus, this technique may be used with the power supply clustering techniques discussed above with reference to FIGS. 1-3. For example, two or more HV rail supplies can be provided for each patch to enable the voltage to that patch to be switched between the HV supplies. In this manner, any of the supply voltages can be used for a particular transmit aperture on a patch by patch basis. In addition, the multiple HV rail supplies can be provided to each microbeamformer transmitter 24 within a single patch 20 so that any of the supply voltages can be used for a particular transmit aperture on a transducer 26 by transducer 26 basis.

In some embodiments of the invention, in addition to or instead of providing for regulation of the voltage to the microbeamformer transmitters 24 in order to regulate the drive signals to the transducers 26, it is possible to regulate the drive current provided by the microbeamformer transmitters 24. In conventional microbeamformers, only the voltage provided by the microbeamformer transmitters 24 is regulated. However, by using a drive current model, the sensitivity of the transducers 26 to current is exploited. That is, rather than driving the transducers 26 solely with voltage excitation (with unlimited current), the transducers 26 are driven with a current, to the extent that the voltages involved can be tolerated by the transducers 26. In this manner, very small driver circuits can be formed and integrated into an IC arranged in close proximity to the transducers 26. In such highly integrated microbeamformers, there is no need for a large cable intervening between the drive circuits and the transducers 26 to be charged and discharged, thereby further improving efficiency of the microbeamformers in accordance with the invention.

Drive current circuits used in the invention generally comprise switchable current sources and sinks which enable a variation in the current provided to the transducers 26. Since current into and out of the transducers 26 roughly corresponds to acoustic velocity, different acoustic signals may be synthesized by varying the drive current.

Figure 5:
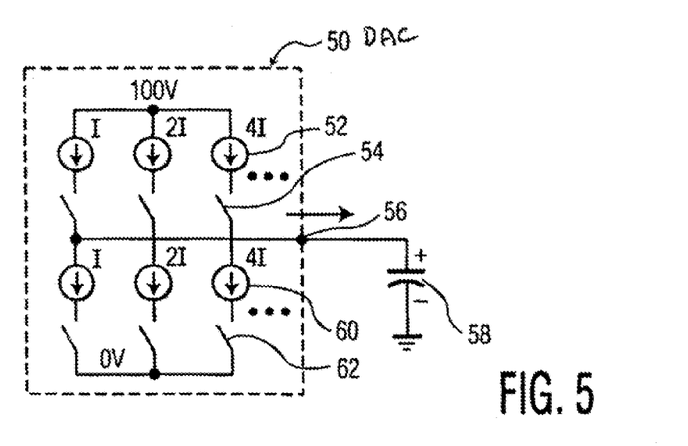
FIG. 5 is a schematic of a first drive current control circuit in accordance with the invention.

A first embodiment of a current-controlled ultrasonic microbeamformer transmitter 24 is shown in FIG. 5 and includes a digital to analog converter (DAC) cell 50 having a plurality of switchable current sources each including a pull-up device 52 connected at one end to the input voltage and a respective switch 54 connected to the other end of the pull-up device 52. Switches 54 are connected via an output node 56 to the transducer 26. The transducer 26 is largely capacitive and is thus represented by a capacitor 58. The switches 54 are controlled in a binary fashion to provide up to eight different current outputs that when the current outputs pass through the pull-up devices 52, eight different currents are provided at the output node 56.

In view of the capacitance of the transducer 26, the voltage developed across the load continues to grow if any of the pull-up devices 52 are enabled. To discharge the capacitor 58, a plurality of switchable current sinks are provided, each current sink including a pull-down device 60 and a respective switch 62. The current sinks are controlled to provide up to eight different discharge currents. For optimal efficiency, it is useful not to allow pull-up devices 52 and pull-down devices 60 to both be enabled at the same time. The voltage at the output node 56 is a function of the cumulative charge transfers on and off the plate of the capacitor 58 and is thus a function of the currents 52 and 60 and the durations that these devices are enabled to drive node 56.

The pull-up devices 52 and pull-down devices 60 may be high voltage MOSFET devices that operate in saturation. The current passing through an "ON" MOSFET is proportional to its width. As such, to implement the DAC cell 50, three high voltage PMOSFET pull-up devices 52 are needed, preferably with different widths, for example with widths 1×, 2×, and 4×, and three NMOSFET pull-down devices 60 with corresponding widths (1×, 2×, and 4×). Alternatively, multiple pull-up or pull-down devices in parallel with common gate connections can be used to provide these different drive currents. The manner in which the gates of the MOSFET devices 52, 60 are controlled and the manner in which similar pull-up and pull-down currents can be obtained would be readily ascertainable to one skilled in the art. It should be also readily apparent to one skilled in the art that the series switches 54, 62 could be eliminated if the gates of the current source/sink MOSFET devices 52, 60 themselves were driven to disable the current flow to/from node 56. Other pull-up and pull-down devices (e.g., bipolar transistors) known to those skilled in the art could also be used in the DAC cell 50.

The foregoing construction of DAC cell 50 applying drive current control circuitry is especially advantageous for controlling ultrasound transducers and in particular microbeamformer transducers since the DAC cells 50 occupy less size than comparable voltage control circuitry (which requires large source/sink currents) and have better suited power limitations. Another advantage is that since there is no tuning network or cable capacitance between the driver and the microbeamformer transducers (as there is in normal cabled transducers), the acoustic response is much more predictable.

A further modification of drive current control circuitry is based on the recognition that the total power provided to the transducers 26, and thus transmitted into the body, is a function not only of drive current but also of time. Accordingly, it is possible to use a high-voltage DAC cell such as the DAC cell 50 described above with reference to FIG. 5, with pulse-width modulating controls to generate different transmit waveforms. The pulse-width modulation concept can also be used with a single current source/sink pair where the times that these currents are asserted can control the output acoustic amplitude.

Figure 6:
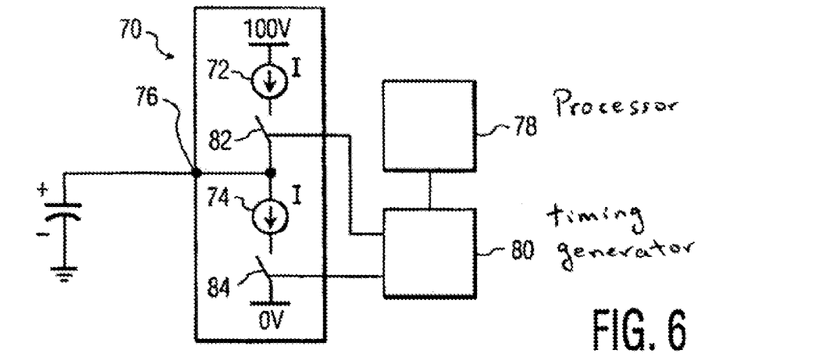
FIG. 6 is a schematic of a second drive current control circuit in accordance with the invention.

FIG. 6 shows a DAC cell 70 applying pulse width modulation. DAC cell 70 includes a single pull-up device 72 and a single pull-down device 74, each provided with a constant current and which are enabled for different amounts of time. This provides the transducer connected to the output node 76 with different pulses of current that can synthesize different waveform amplitudes or shapes.

A control computer or processor 78 is provided to specify events for the control changes and the events for each line and frame of the imaging process, and may also optionally generate such events. The control computer 78 directs the required event commands to a timing generator 80, and optionally to the mainframe transmitters. The mainframe transmitters can provide a full power waveform to the DAC cell 70 via power supply rails as well as in any of the constructions described above. The ultrasound imaging system can also include other components for generating the event commands for providing a desired transmit waveform as known in the art.

The timing generator 80 determines the number of pulses in each burst, the pulse train frequency, the pulse width and the delay (used for focusing) and generates an appropriate timing signal which will cause the DAC cell 70 to generate the desired waveform from the power supply upon receiving the timing signal.

More specifically, the timing generator 80 generates a timing signal or pulse width modulation signal for the switches 82, 84. The extent to which switch 82 is on or off, i.e., the time in which the switch 82 is on, determines the width of the current pulse from the pull-up device 72. The extent to which switch 84 is on or off, i.e., the time in which the switch 84 is on, determines the width of the current pulse to ground through the pull-down device 74.

Figure 7:
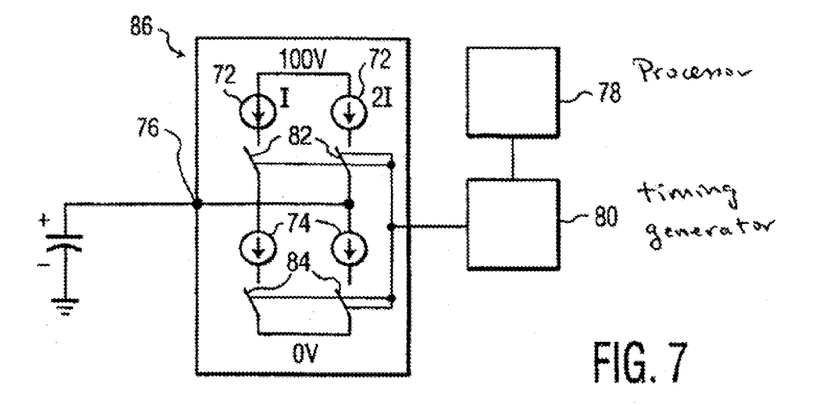
FIG. 7 is a schematic of a third drive current control circuit in accordance with the invention.

The DAC cell 70 is shown with a single pull-up device 72 and a single pull-down device 74. As shown in FIG. 7, it is also possible to construct a DAC cell 86 with multiple pull-up and pull-down devices which provide a plurality of different currents. Thus, if MOSFET devices are used as the pull-up devices 72 and the pull-down devices 74, the widths of the MOSFET devices are different, for example, x, 2× as shown. In this manner, different currents are provided by the different combinations of opening and closing the switches 82,84.

Control of the timing of the pull-up and pull-down devices 72, 74 when these devices 72, 74 drive the transducer is complex but can be ascertained by one skilled in the art. The capacitive load should be adequately controlled from one channel to the next so that consistent acoustic outputs can be obtained.

The current-mode scaling/apodization techniques discussed above with reference to FIGS. 4-6 are adequate when the voltage developed at the output of the microbeamformer transmitter 24 does not reach the high voltage supply rail (the HV rail). When the output voltage approaches that of the HV rail, the PMOSFETS pull-up devices 72 come out of saturation and eventually stop conducting current when the HV rail equals the voltage on the transducer 26. Thus, it is a drawback that the current modulation and current-pulse-width modulation techniques are ineffective when the transducer voltage charges all the way to the HV rail. However, to maximize acoustic power output, a charge as close as possible to the HV rail is desired. Since there is inherently some uncertainty in both the driver current and actual element load, it is very difficult to obtain maximum output acoustic power and still have good control over the transmit waveforms.

The current-mode techniques discussed above with reference to FIGS. 5-7 are sensitive to element load and to driver variability resulting in operational drawbacks and thus are not suitable for all applications. To overcome these drawbacks, the power (voltage) supply control techniques presented earlier in FIGS. 1-4 can also be used in conjunction with the current-mode techniques discussed above. For example, the pull-up device 92A and pull-down device 92B in the dual HV rail circuit in FIG. 4A could implement current sources 72 and 74 in FIG. 7. The gates of the pull-up device 92A and pull-down device 92B, labeled with UP and DOWN in FIG. 4, could be driven with appropriate pulse-width modulated signals so as to supply fixed source and sink currents to the transducer 26 for specific durations of time. If the pulse duration is not long enough for the output node 98 to be driven to the selected HV rail (either 88 or 90), then the pulse-width modulation techniques may be used. On the other hand, if the pulse duration is long enough to fully charge the output node 98 to the selected HV rail, then the voltage supply techniques (clustering etc.) may be used.

Although illustrative embodiments of the present invention have been described herein with reference to the accompanying drawings, it is to be understood that the invention is not limited to these precise embodiments, and that various other changes and modifications may be effected therein by one of ordinary skill in the art without departing from the scope or spirit of the invention.

The invention claimed is:

1. A system for apodization control of a microbeamformer, comprising:
   a mainframe beamformer having a plurality of mainframe channels, each of said mainframe channels including a mainframe receiver and a mainframe transmitter for transmitting a pulsed power supply voltage;
   a plurality of microbeamformer patches, each of said microbeamformer patches including a plurality of microbeamformer channels, each of said microbeamformer channels including a transducer, a microbeamformer transmitter and control circuit for driving said transducer, a microbeamformer receiver for receiving signals from said transducer and a delay element for delaying the received transducer signals, said microbeamformer transmitters in each of said microbeamformer patches being connected to a common node;
   a plurality of separate electrical connectors, each of said connectors connecting said common node in a respective one of said microbeamformer patches to a respective one of said mainframe channels such that said mainframe transmitter in said respective mainframe channel provides the pulsed power supply voltage to all of said microbeamformer transmitters in said microbeamformer patch via said connector;
   isolation devices configured to isolate said microbeamformer transmitters and said mainframe transmitters when said microbeamformer receivers and said mainframe receivers are operative; and
   protection devices configured to protect said microbeamformer receivers and said mainframe receivers when said microbeamformer transmitters and said mainframe transmitters are operative.

2. The system of claim 1, wherein said isolation devices are arranged between each of said connectors and said mainframe transmitter in the respective one of said mainframe channels and between each of said connectors and said common node of the respective one of said microbeamformer patches.

3. The system of claim 1, wherein said isolation devices comprise diodes.

4. The system of claim 1, wherein said protection devices are arranged between each of said connectors and said mainframe receiver in the respective one of said mainframe channels and between each of said connectors and said microbeamformer receivers in each of said microbeamformer channels.

5. The system of claim 1, wherein said protection devices comprise switches.

6. The system of claim 1, wherein said connectors comprise cables.

7. The system of claim 1, wherein said mainframe transmitter in each of said mainframe channels is arranged to transmit a unipolar pulse for the duration of each transmit burst by said microbeamformer transmitters in the respective one of said microbeamformer patches.

8. The system of claim 7, wherein said mainframe transmitters provide the power supply voltage for each of said microbeamformer transmitters in the respective one of said microbeamformer patches and thus defines the pulse amplitude applied to each of said transducers in the respective one of said microbeamformer patches.

9. The system of claim 8, wherein said mainframe transmitters are arranged to vary the transmitted voltage.

10. The system of claim 1, wherein said microbeamformer transmitter in at least one of said microbeamformer channels comprises:
    a plurality of switchable current sources, each of said current sources comprising a pull-up device arranged to receive the pulsed power supply voltage and a switch interposed between said pull-up device and said transducer of said microbeamformer channel; and
    a plurality of switchable current sinks, each of said current sinks comprising a pull-down device and a switch interposed between said pull-down device and ground, said pull-down devices being arranged to discharge said transducer through said switches.

11. The system of claim 10, wherein said pull-up devices are PMOSFET devices operating in saturation, said PMOSFET devices having different widths and providing a current proportional to the width.

12. The system of claim 10, wherein said pull-down devices are NMOSFET devices having different widths and providing a current proportional to the width.

13. The system of claim 1, wherein said microbeamformer transmitter in at least one of said microbeamformer channels comprises:
    at least one switchable current source, each of said at least one current source comprising a pull-up device arranged to receive the pulsed power supply voltage and a switch interposed between said pull-up device and said transducer of said microbeamformer channel;
    at least one switchable current sink, each of said at least one current sink comprising a pull-down device and a switch interposed between said pull-down device and ground, said pull-down device being arranged to discharge said transducer through said switch; and
    a controller configured to control said switches in each of said at least one current source and said at least one current sink to pulse width modulate a transmit waveform generated by said microbeamformer transmitter.

14. The system of claim 13, wherein said controller comprises a timing generator for generating signals to control said switch in each of said at least one current source and said at least one current sink and a control computer for controlling said timing generator.

15. The system of claim 13, wherein said at least one current source comprises a plurality of current sources, said pull-up devices in said current sources being PMOSFET devices operating in saturation and having different widths and providing a current proportional to the width.

16. The system of claim 15, wherein said at least one current sink comprises a plurality of current sinks, said pull-down devices in said current sinks being NMOSFET devices operating in saturation and having different widths and providing a current proportional to the width.

17. The system of claim 16, wherein said controller comprises a timing generator for generating signals to control said switches in each of said current sources and said current sinks and a control computer for controlling said timing generator.

18. A system for apodization control of a microbeamformer, comprising:

a plurality of microbeamformer patches, each of said microbeamformer patches including a plurality of microbeamformer channels, each of said microbeamformer channels including a transducer, a microbeamformer transmitter and control circuit for driving said transducer, a microbeamformer receiver for receiving signals from said transducer and a delay element for delaying the received transducer signals, said microbeamformer patches being grouped into a plurality of clusters such that each of said clusters includes a plurality of said microbeamformer patches, said microbeamformer transmitters in each of said clusters being connected to a common node;

a mainframe beamformer having a plurality of individually adjustable power supplies and a plurality of mainframe channels, each of said channels including a mainframe receiver;

a first connecting device configured to connect said microbeamformer receivers in each of said microbeamformer patches to a respective one of said mainframe channels; and a second connecting device configured to connect each of said clusters to a respective one of said power supplies.

19. The system of claim 18, wherein said first connecting device and said second connecting device comprise cables.

20. The system of claim 18, wherein the power supply voltage applied to each of said clusters is independently adjustable.

21. The system of claim 20, wherein the power supply voltage applied to each of said clusters is adjustable to a different voltage for each pulse repetition interval.

22. The system of claim 18, wherein said microbeamformer transmitter in at least one of said microbeamformer channels comprises:

a plurality of switchable current sources, each of said current sources comprising a pull-up device arranged to receive the pulsed power supply voltage and a switch interposed between said pull-up device and said transducer of said microbeamformer channel; and a plurality of switchable current sinks, each of said current sinks comprising a pull-down device and a switch interposed between said pull-down device and ground, said pull-down devices being arranged to discharge said transducer through said switches.

23. The system of claim 22, wherein said pull-up devices are PMOSFET devices operating in saturation, said PMOSFET devices having different widths and providing a current proportional to the width.

24. The system of claim 22, wherein said pull-down devices are NMOSFET devices having different widths and providing a current proportional to the width.

25. A system for apodization control of a microbeamformer, comprising:

a mainframe beamformer having a plurality of mainframe channels, each of said mainframe channels including a mainframe receiver;

a plurality of microbeamformer channels, each of said microbeamformer channels including a transducer, a microbeamformer transmitter for driving said transducer, a microbeamformer receiver for receiving signals from said transducer and a delay element for delaying the received transducer signals;

a supply device configured to selectively supply one of a plurality of different voltages to said microbeamformer transmitters.

26. The system of claim 25, wherein said supply device comprises:

a plurality of high voltage rails, a first one of said rails providing a higher voltage than a second one of said rails;

a pull-up device interposed between said rails and said transducer;

a switch interposed between said first rail and said pull-up device, said switch being controlled such that when in an on position, the voltage provided to said pull-up device is that of said first rail and when in an off position, the voltage provided to said pull-up device is that of said second rail; and a diode interposed between said second rail and said pull-up device.

27. The system of claim 26, further comprising at least one current sink for discharging said transducer, said at least one current sink comprising a pull-down device connectable to ground.

28. The system of claim 26, wherein said microbeamformer channels are grouped into a plurality of microbeamformer patches, each of said microbeamformer patches including a plurality of said microbeamformer channels, said microbeamformer transmitters in each of said microbeamformer patches being connected to a respective common node with each of said rails such that the same voltage is provided to all of said microbeamformer transmitters in said microbeamformer patch by said supply device.

29. The system of claim 26, wherein said microbeamformer channels are grouped into a plurality of microbeamformer patches, each of said microbeamformer patches including a plurality of said microbeamformer channels, and said microbeamformer patches are grouped into a plurality of clusters, each of said clusters including a plurality of said microbeamformer patches, said microbeamformer transmitters in each of said clusters being connected to a respective common node with each of said rails such that the same voltage is provided to all of said microbeamformer transmitters in said cluster by said supply device.

30. The system of claim 26, wherein said rails are connected to each of said microbeamformer transmitters, said pull-up device, said switch and said diode being arranged in each of said microbeamformer transmitters.

31. The system of claim 25, wherein said supply device comprises:

a plurality of high voltage rails providing different voltages; and a plurality of pull-up devices, each of said pull-up devices being interposed between a respective one of said rails and said transducer.

* * * * *